(12) United States Patent
Wagner et al.

(10) Patent No.: US 8,064,686 B2
(45) Date of Patent: Nov. 22, 2011

(54) METHOD AND DEVICE FOR THE CONTACTLESS OPTICAL DETERMINATION OF THE 3D POSITION OF AN OBJECT

(75) Inventors: Robert Wagner, Neuburg am Inn (DE); Rainer Hesse, Ortenburg (DE)

(73) Assignee: Micro-Epsilon Messtechnik GmbH & Co. KG (DE)

( * ) Notice: Subject to any disclaimer, the term of this patent is extended or adjusted under 35 U.S.C. 154(b) by 1530 days.

(21) Appl. No.: 11/389,381

(22) Filed: Mar. 24, 2006

(65) Prior Publication Data

US 2007/0009149 A1 Jan. 11, 2007

Related U.S. Application Data

(63) Continuation of application No. PCT/DE2004/002132, filed on Sep. 23, 2004.

(30) Foreign Application Priority Data

Sep. 26, 2003 (DE) .................................. 103 45 112

(51) Int. Cl.
*G06K 9/00* (2006.01)
(52) U.S. Cl. ......... 382/154; 382/285; 382/291; 382/295
(58) Field of Classification Search .................... 382/154
See application file for complete search history.

(56) References Cited

U.S. PATENT DOCUMENTS

| 4,630,225 | A | | 12/1986 | Hisano |
| 4,942,539 | A | | 7/1990 | McGee et al. |
| 5,380,978 | A | * | 1/1995 | Pryor ........................ 219/121.64 |
| 5,388,059 | A | | 2/1995 | DeMenthon |
| 6,081,273 | A | * | 6/2000 | Weng et al. .................... 345/420 |
| 6,300,974 | B1 | | 10/2001 | Viala et al. |
| 6,771,808 | B1 | * | 8/2004 | Wallack ......................... 382/151 |
| 2002/0159637 | A1 | * | 10/2002 | Echigo et al. .................. 382/190 |
| 2003/0051326 | A1 | * | 3/2003 | Lawson et al. .............. 29/407.01 |

FOREIGN PATENT DOCUMENTS

| EP | 1 043 689 A2 | 10/2000 |
| WO | WO 03/030738 A1 | 4/2003 |

OTHER PUBLICATIONS

Wlczek et al., "Pose Estimation of Three-Dimensional Objects from Single Camera Images", *Digital Signal Processing*, vol. 5, (1995) pp. 176-183.

(Continued)

*Primary Examiner* — Anand Bhatnagar
*Assistant Examiner* — Michael Vanchy, Jr.
(74) *Attorney, Agent, or Firm* — Alston & Bird LLP

(57) ABSTRACT

A device for the contactless optical determination of the position of an object. In particular, the present invention provides a method and device for the contactless optical determination of the 3D position of an object wherein an image of the object is generated by means of a camera and the 3D position of the object is calculated from the camera image based on the image information about detected geometrical characteristics. Determination of the 3D position of the object includes determination of the 3D position and the 3D orientation of the object.

17 Claims, 1 Drawing Sheet

OTHER PUBLICATIONS

Dhome, et al., "Determination of the Attitude of 3-D Objects from a Single Perspective View", *IEEE Transactions on Pattern Analysis and Machine Intelligence*, Dec. 11, 1989, vol. 11, No. 12, pp. 1265-1278.

Salvi, et al., "A comparative review of camera calibrating methods with accuracy evaluation", *Pattern Recognition*, 35 (2002), pp. 1617-1635.

Wenli et al., "Pose Estimation Problem in Computer Vision", *IEEE Tencon '93*, pp. 1138-1141.

Kite et al., "Determining the 3D Position and Orientation of a Robot Camera Using 2D Monocular Vision", *Pattern Recognition*, 23 (1990) No. 8, pp. 819-831.

* cited by examiner

METHOD AND DEVICE FOR THE CONTACTLESS OPTICAL DETERMINATION OF THE 3D POSITION OF AN OBJECT

CROSS REFERENCE TO RELATED APPLICATION

The present application is a continuation of international application PCT/DE2004/002132, filed 23 Sep., 2004, and which designates the U.S. The disclosure of the referenced application is incorporated herein by reference.

BACKGROUND OF THE INVENTION

The present invention relates to a method and a device for the contactless optical determination of the 3D position of an object, wherein the determination of the 3D position includes the determination of the 3D position and the 3D orientation of the object and wherein the geometrical characteristics of the object are known.

The automation of production flows plays an increasingly important role in industrial manufacturing. For production lines, which do not allow an exact positioning of the components to be processed, it is especially important to know the complete 3D position of the component, i.e., the 3D position and the 3D orientation in space, in order to be able to grasp and process the component using a robot.

In addition, the determination of the 3D position can be used for calibrating a robot. The geometrical characteristics are thereby arranged in a known manner on the robot arm, or a calibration target is mounted on the robot arm. The robot arm is moved in the lens coverage of a stationarily mounted camera and thereafter the determination of the 3D position of the robot arm is carried out in order to examine and/or recalibrate its position and orientation.

Another application is the determination of the 3D position of components in the installed state. By determining the position of a reference part, for example, it is possible to examine whether the position of installed parts is consistent with the position of the reference part, in order to thus determine incorrectly mounted components.

Nowadays, known devices for determining the 3D position are exclusively multi-camera systems, which involve considerable costs due to the use of two or more cameras. In the context of the use of a single camera, only adjusted 2D methods for grasping components are known so far, i.e., the position and orientation in a plane (3 degrees of freedom) and additionally height information about the height of the component (1 more degree of freedom) are determined. However, using this known method, at most 2½D information is obtained about the position of the component, as a result of which, for example, it is not possible to correctly grasp the component when the latter is in an oblique position.

The calibration of a robot is mostly carried out manually according to the current state of the art, due to the lack of corresponding auxiliary means for setting up all 6 degrees of freedom. The calibration is extremely time-consuming, thus resulting in long maintenance intervals. In addition, the manual calibration methods are, in general, relatively inaccurate.

Nowadays, the determination of the position of a component after its installation can also be carried out using only multi-camera systems. Alternatively, sensory solutions for single measured variables are known, wherein said solutions solve the actual total problem using a multi-sensor evaluation. Such sensory multiple measurements are also time-consuming and are often hardly helpful for the overall assessment of the 3D position.

The object of the present invention is to design and to further improve a method and a device for the contactless optical determination of the 3D position of an object in such a way that it is possible to determine complete 3D information about the object to be studied using simple means and at high measuring speed and measuring accuracy.

BRIEF SUMMARY OF THE PRESENT INVENTION

The inventive method for the contactless optical determination of the 3D position of an object achieves the above objectives and others by providing a method wherein an image of the object is generated by means of a camera and the 3D position of the object is calculated from the camera image based on the image information about the detected geometrical characteristics. Specifically, the method comprises generating an image of the object by means of a camera, and calculating the 3D position of the object from the camera image based on image information about the detected geometrical characteristics, wherein the camera is held stationary with a fixed alignment, the complete determination of the 3D position is carried out by means of a single image acquisition using the camera, and a known 3D-position of the geometric characteristics is assigned in each case to the corresponding two-dimensional image information.

DETAILED DESCRIPTION

Figure 1:
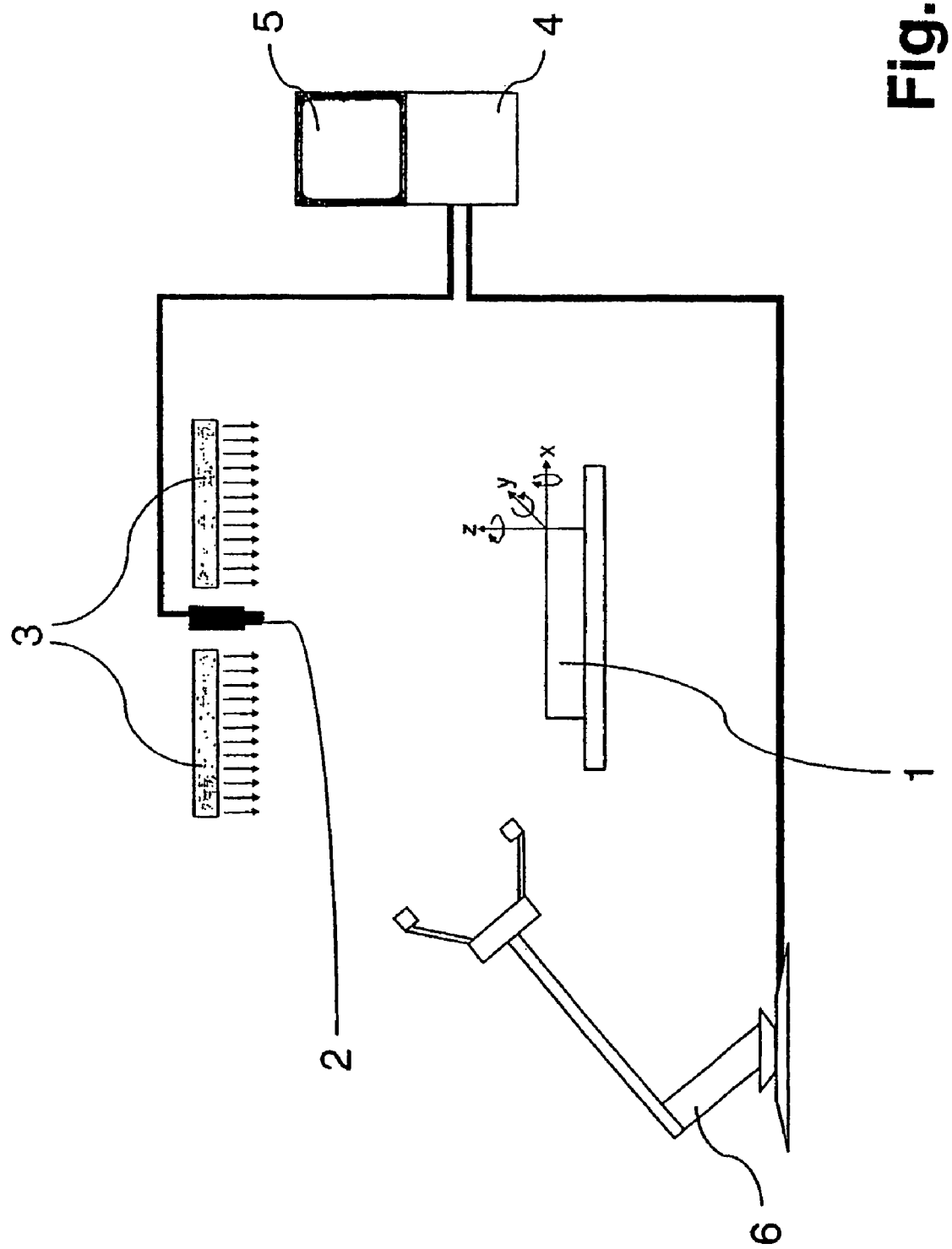
FIG. 1 shows a schematic illustration of a device according to one embodiment of the invention for the contactless optical determination of the 3D position of an object.

It was first realized in the inventive manner that the use of several cameras for the determination of the 3D position is extremely expensive with respect to the costs and also in relation to the mounting and adjusting of the camera. Deviating from the known methods, an image of the object is generated by means of a camera and the 3D position of the object is calculated from the camera image based on the image information in relation to the geometrical characteristics. Due to the simplicity and compactness, the influence of the inventive method on motion sequences in production has substantially reduced. When calibrating a robot, it is possible, with the help of the inventive method, to leave out a generally inaccurate manual setting and thus a higher measure of reliability can be guaranteed. In addition, this also enables a faster setting of the robot and thus a shortening of the maintenance intervals.

With a view to achieve an especially high efficiency of the method, the complete determination of the 3D location is carried out in a particularly advantageous manner by means of a single image acquisition using the camera.

As the basis for calculating the 3D position, the real imaging process of the camera can be modeled by a mathematic model. In the framework of the imaging process, it is possible to take into account especially the position and orientation between the object to be studied and the camera, characteristics of the optics used (focal length, distortion etc.), perspective transformations and also digitization and discretization of the illuminance during the image acquisition in the camera and/or in a computer.

Based on the model, a correlation can be made of the known 3D position of the geometrical characteristics and the corresponding two-dimensional image information. In other words, a (usually non-linear) system of equations can be prepared into which the parameters of the imaging process are entered as unknown variables.

For example, two equations are obtained from the correlation of a 3D point on the object with its 2D image position. By the use of several characteristics, it is thus possible to list a system of equations for all the free parameters of the imaging process and to determine the unknown variables using mathematical methods. In an advantageous way more equations are used, which are modeled in the system as free parameters. For solving such an over-determined system of equations, non-linear optimization methods can then be used in order to determine an optimal solution.

In view of ensuring a high measure of simplicity, the camera can be held stationary. In addition, the alignment of the camera can also be fixedly predetermined.

Depending on the specific application, points, straight lines, angles, circles, elliptical contours, and/or conic sections can be used as geometrical characteristics, which are provided on known locations on the object. The only important point in this context is that these geometrical characteristics be generally mathematically describable contours and shapes which are known with regard to the component and can be observed and evaluated well in the camera image.

The geometrical objects can be used for calibrating as well as for determining the position. Within the frame of calibration, the geometrical objects can, for example, be used in order to determine the internal camera parameters. Using the calibration, optical distortions can be corrected and especially the relation of the 3D position between the camera coordinate system and the object coordinate system can be determined. In place of the geometrical characteristics of the object, even a separate calibration target can be used for calibration.

By the use of the camera calibration and the evaluation of the thereby determined so-called external camera parameters (3 parameters for position, 3 parameters for rotation), the 3D position of the object in relation to the camera coordinate system can be determined. Alternatively, it is possible to determine the 3D position of the object in relation to another arbitrarily determinable fixed coordinate system, for example compared to a world coordinate system, which can be determined using an additional setup step. Within the framework of motion measurements or comparison measurements of reference master parts, the 3D position of the object can be determined even in relation to a dynamic coordinate system.

In one specific embodiment, one or more additional cameras are provided, that generate an image of the object—preferably from different camera angles. For the generation of additional images, several stationary single cameras or one or more moving cameras can be used. Using the additional images, the calculated 3D positions can be evaluated with the help of an additional quality criterion and corrections can be carried out, if necessary. The result achieved is a further improved accuracy of the determination of the 3D position.

Furthermore, additional, supporting sensors could be provided, with whose help errors in the determination of the 3D position can be compensated and/or corrected. Specifically, for example, these sensors are temperature sensors for the compensation of fluctuations in the ambient temperature, so that it is possible to take into account the temperature-dependent expansion of the object to be studied when calculating the 3D position.

In an especially advantageous manner, a tracking measurement and/or a camber measurement can be carried out on motor vehicles based on geometrical characteristics of the rim. It is thereby possible for marked locations on the rim to be automatically provided as geometrical characteristics. The marked locations can be, for example, the valve or the hubcap. In a preferred embodiment, the marked locations provided are interactively accepted or rejected by the user. Due to the knowledge of the geometrical shape on the rim, it is consequently possible to check the wheelbase in all its degrees of freedom. Thus firstly, the requirement of a projecting pattern on the rim is omitted and secondly, it is possible to determine a positive or negative axle camber in case of a loose suspension strut.

With respect to another embodiment of the present invention, the above objectives and others are achieved by providing a device for the contactless optical determination of the 3D location of an object comprising a camera for generating an image of the object, wherein the 3D location of the object can be calculated from the camera image based on the image information about the detected geometrical characteristics.

With respect to a fast evaluation of the camera images and an immediate calculation of the 3D position, the device advantageously comprises a computer such as an industrial personal computer, which is equipped with suitable image processing software.

There are different options of advantageously designing and further improving the teaching of the present invention. Generally preferred design forms and configurations of the teaching are also explained in conjunction with the explanation of the preferred embodiment of the invention on the basis of the drawing.

Referring to FIG. 1, there is shown a schematic illustration of one embodiment of a device according to the present invention for the contactless optical determination of the 3D position of an object. The figure illustrates schematically a device for the contactless optical determination of the 3D position of an object 1, wherein the 3D position of the object 1 is determined in relation to a spatially fixed coordinate system using the axes x, y and z. For this purpose, an image of the object 1 is generated by a camera 2 positioned above the object 1. The position and alignment of the camera 2 must be fixedly predetermined in relation to the spatially fixed coordinate system xyz. During the image acquisition, light sources 3 arranged circumferentially around the camera 2 provide for sufficient illumination of the object 1.

The camera data is transferred to an industrial personal computer 4 comprising a monitor 5. There the correlation of the 2D image information with the known 3D position of the geometrical characteristics (not illustrated) present on the object 1 takes place. For all free parameters of the imaging process, an over-determined system of equations is prepared for the solution of which non-linear optimization processes are used. After the solution of the system of equations, the exact 3D position of the object 1 can be determined and the coordinates can be transferred to a robot 6. With the knowledge of the position and orientation of the object 1, the robot 6 can grasp and/or process the object 1—after corresponding calibration.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for the contactless optical determination of the 3D position of an object wherein the determination of the 3D position includes the determination of the 3D position and the 3D orientation of the object and wherein the geometrical characteristics of the object are known, comprising:

generating an image of the object by means of a camera; and calculating the 3D position of the object from the camera image based on image information about the detected geometrical characteristics, wherein the camera is held stationary with a fixed alignment, the complete determination of the 3D position is carried out by means of a single image acquisition using the camera, a known 3D-position of the geometric characteristics is assigned in each case to the corresponding two-dimensional image information, and wherein a system of equations is prepared for all the free parameters of the imaging process, wherein an over-determination is established by employing more equations than free parameters being modeled in the system.

2. The method according to claim 1, wherein non-linear optimization methods are used to solve the over-determined system of equations.

3. The method according to claim 1, wherein the alignment of the camera is predetermined.

4. The method according to claim 1, wherein general mathematically describable contours and shapes are used as geometrical characteristics.

5. The method according to claim 4, wherein at least one of points, straight lines, angles, circles, elliptical contours, or conic sections are used as geometrical characteristics.

6. The method according to claim 1, wherein the camera is calibrated with the help of the geometrical characteristics.

7. The method according to claim 6, wherein internal camera parameters are determined within the framework of a calibration.

8. The method according to claim 1, characterized in that the 3D position of the object is determined in relation to a fixed coordinate system.

9. The method according to claim 1, wherein the 3D position of the object is determined in relation to at least one of a camera coordinate system, an object coordinate system, or a world coordinate system.

10. The method according to claim 1, wherein the 3D position of the object is determined in relation to a dynamic coordinate system.

11. The method according to claim 1, wherein the image of the object is generated using one or more additional cameras.

12. The method according to claim 11, wherein the image of the object is generated from different camera angles.

13. The method according to claim 11, wherein the quality of the calculated 3D position of the object is determined by means of the additional images, and, if necessary, corrections are made.

14. The method according to claim 1, wherein errors in the determination of the 3D position are compensated or corrected by means of sensors.

15. The method according to claim 1 wherein at least one of a tracking measurement or a camber measurement is carried out on a motor vehicle on the basis of geometrical characteristics of a rim of the motor vehicle.

16. The method according to claim 15, wherein automatically marked locations on the rim provide the geometrical characteristics.

17. The method according to claim 16, wherein the marked locations provided may be interactively accepted or rejected by a user.

* * * * *